UNITED STATES PATENT OFFICE.

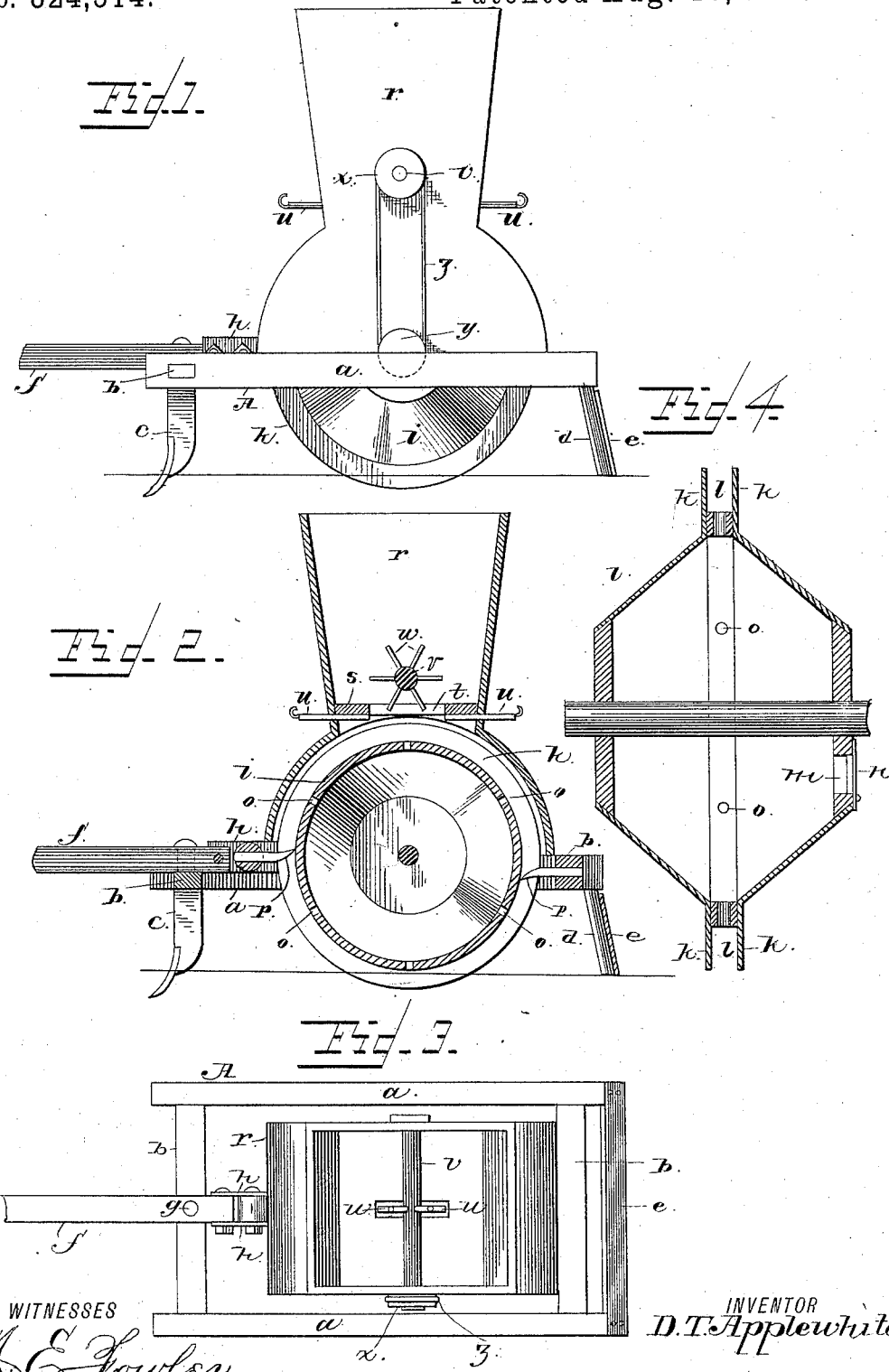

DAVID THOMAS APPLEWHITE, OF CLAYTON, TEXAS.

COTTON, CORN, AND PEA PLANTER.

SPECIFICATION forming part of Letters Patent No. 324,514, dated August 18, 1885.

Application filed June 12, 1885. (No model.)

*To all whom it may concern:*

Be it known that I, DAVID T. APPLEWHITE, a citizen of the United States, residing at Clayton, in the county of Panola and State of Texas, have invented a new and useful Improvement in Cotton, Corn, and Pea Planters, of which the following is a specification, reference being had to the accompanying drawings.

My invention relates to an improvement in combined planters and fertilizer-distributers; and it consists in the peculiar construction and combination of devices, that will be more fully set forth hereinafter, and particulary pointed out in the claims.

In the accompanying drawings, Figure 1 is a side elevation of a planter and fertilizer-distributer embodying my invention. Fig. 2 is a vertical sectional view of the same. Fig. 3 is a top plan view. Fig. 4 is a detailed sectional view.

A represents a frame composed of the longitudinal side bars $a$ and the connecting end bars $b$. From the center of the front end bar depends a furrow-opener, $c$, and from the rear ends of the side bars depend the rearwardly-inclined supports $d$, to which is attached a transverse covering-wing, $e$. A tongue or stud, $f$, is mortised centrally to the front end bar, and engages on a vertical pin, $g$, that is provided with the front end bar and enters an opening in the tongue. By this construction it will be readily understood that the tongue can be easily removed from the frame.

Pivoted to the inner end of the stud $f$ are two rearwardly-extending arms, $h$, the rear ends of which diverge, as shown, and in between these arms is journaled a revolving hollow drum, $i$, which is provided on the center of its periphery with the annular flanges $k$, leaving a groove, $l$, between them. An opening, $m$, which can be closed by a slide, $n$, is made in one end of the drum near the center thereof, and a series of openings, $o$, is made in the periphery of the drum, communicating with the groove $l$. The sides of the drum, between the flanges and the ends, are inclined, the drum being thus substantially of a double-funnel shape; and it is evident by this construction that every particle placed in the drum will be discharged therefrom by its rotation through the openings $o$. Scrapers $p$ are secured to the frame and enter the groove $l$, and keep the groove clear of dirt. A hopper, $r$, is supported on the arms $h$, the upper side of the drum revolving in the lower side of the hopper. This hopper is provided with a bottom, $s$, above the drum, and the bottom is provided with a central slotted opening, $t$. Endwise-moving slides $u$ are provided to regulate the size of the opening.

$v$ represents a transverse shaft that is journaled in the sides of the hopper above the bottom, and is provided with radial stirrers $w$ at its center, and on one projecting end with a pulley, $x$. A similar pulley, $y$, is fixed on one end of the shaft with the drum, and these pulleys are connected by the endless strap or band $z$.

The operation of my invention is as follows: Cotton, corn, or peas to be planted are placed in the hopper, and fertilizer to be sowed therewith is placed in the revolving drum. When the machine is drawn along, the rotation of the drum deposits fertilizer in the furrow made by the furrow-opener, and the rotation of the drum is communicated to the stirrer-shaft, which causes the seeds in the hopper to drop through the opening in the bottom thereof, and as the groove in the drum is directly beneath the said opening, the seeds are caught in the groove, and as the drum rotates are carried and caused to drop directly into the furrow. The wing $e$, working in rear of the drum, covers the seeds.

It will be understood that by reason of the arms which support the drum and the hopper being pivoted at their front ends the drum is adapted to rise over any obstruction and thereby avoid breakage.

If preferred, the planting devices may be removed from the frame A by removing the tongue or stud therefrom, and attached to the rear lower side of the standard of an ordinary plow or between the converging ends of the beams of a harrow by bolting the tongue to the plow-standard or the harrow, and thus the frame A may be dispensed with and the planting devices constituted into an attachment for a plow or harrow. The slides $u$ regulate the quantity of seed sown, and by spacing the openings in the groove of the drum the latter may be adapted for sowing any desired quantity of fertilizer to the acre.

Having thus described my invention, I claim—

1. The combination, in a planter and fertilizer-distributer, of a revolving drum having openings communicating with a groove in its periphery for sowing fertilizer, and a seeding mechanism arranged above the drum, whereby the seeds will fall into the groove of the drum and be thereby conveyed to the furrow, substantially as described.

2. The combination, with a plow, harrow, or other device adapted for opening furrows, of the stud or tongue, the arms pivoted thereto, and the hopper secured to the arms, said hopper having the revolving grooved drum, and the dropping mechanism above the drum, and means for securing the tongue or stud to the plow or harrow, substantially as described.

3. The combination, with a plow, harrow, or other device adapted for opening furrows, of the stud or tongue secured thereto, the arms pivoted to the tongue, the hopper supported on the arms, the revolving drum journaled therein and forming the support therefor, the slides adapted to regulate the size of the openings in the bottom of the hopper, the seed-stirrer, and gearing or means for connecting the stirrer with the drum, substantially as described.

In testimony that I claim the foregoing as my own I have hereto affixed my signature in presence of two witnesses.

DAVID THOMAS APPLEWHITE.

Witnesses:
J. H. HAWTHORN,
R. P. ASH.